(12) United States Patent
Ahn

(10) Patent No.: US 10,232,734 B2
(45) Date of Patent: Mar. 19, 2019

(54) LINEAR MOTOR MOTION STAGE WITH PASSIVE REACTION FORCE COMPENSATION FUNCTION

(71) Applicant: Foundation of Soongsil University-Industry Cooperation, Seoul (KR)

(72) Inventor: Hyeong Joon Ahn, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 0 days.

(21) Appl. No.: 15/860,798

(22) Filed: Jan. 3, 2018

(65) Prior Publication Data

US 2018/0186249 A1 Jul. 5, 2018

(30) Foreign Application Priority Data

Jan. 3, 2017 (KR) .................. 10-2017-0000842

(51) Int. Cl.
*B60L 13/04* (2006.01)
*B61B 13/08* (2006.01)
*B60L 13/03* (2006.01)
*H02K 41/00* (2006.01)
*H02K 41/035* (2006.01)
*H02K 5/24* (2006.01)

(52) U.S. Cl.
CPC .............. *B60L 13/04* (2013.01); *B60L 13/03* (2013.01); *B61B 13/08* (2013.01); *H02K 5/24* (2013.01); *H02K 41/00* (2013.01); *H02K 41/0356* (2013.01)

(58) Field of Classification Search
CPC ........ H02K 35/02; H02K 33/00; H02K 41/00; H02K 41/0356; H02K 5/24; H02K 7/16; B60L 13/03; B60L 13/04; B61B 13/08
See application file for complete search history.

(56) References Cited

U.S. PATENT DOCUMENTS 3,525,887 A * 8/1970 Ewart, Jr. .............. H02K 33/00
310/17
5,504,407 A * 4/1996 Wakui ................. G03F 7/70716
318/568.17

(Continued)

FOREIGN PATENT DOCUMENTS

KR 101341629 B1 12/2013
KR 10-1644175 B1 7/2016

*Primary Examiner* — Thai T Dinh
(74) *Attorney, Agent, or Firm* — Pearne & Gordon LLP

(57) ABSTRACT

Provided is a linear motor motion stage having a passive reaction force compensation function. The linear motor motion stage includes: a base; a magnet track moving on the base; a mover which is moved on a surface of the magnet track by an electromagnetic force generated in a gap with the magnet track; first and second horizontal springs arranged between one side and the other side, respectively, of the magnet track and the base and configured to attenuate a reaction force applied to the base by movement of the mover; and a cross spring arranged between a lower side of the magnet track and the base and configured to attenuate the reaction force. Herein, the linear motor motion stage controls reaction force compensation applied to the linear motor motion stage by controlling the stiffness of the cross spring.

10 Claims, 7 Drawing Sheets

(56) References Cited

U.S. PATENT DOCUMENTS

| 6,157,159 | A | * | 12/2000 | Korenaga | G03F 7/70358 |
| | | | | | 108/20 |
| 2005/0082994 | A1 | * | 4/2005 | Qiu | F16F 7/1011 |
| | | | | | 318/128 |
| 2014/0015346 | A1 | * | 1/2014 | Schober | A61C 17/225 |
| | | | | | 310/15 |

\* cited by examiner

LINEAR MOTOR MOTION STAGE WITH PASSIVE REACTION FORCE COMPENSATION FUNCTION

CROSS-REFERENCE TO RELATED APPLICATION

This application claims the benefit under 35 USC 119(a) of Korean Patent Application No. 10-2017-0000842 filed on Jan. 3, 2017, in the Korean Intellectual Property Office, the entire disclosures of which are incorporated herein by reference for all purposes.

TECHNICAL FIELD

The present disclosure relates to a linear motor motion stage with a passive reaction force compensation function.

BACKGROUND

A linear motor is configured to convert rotary drive of a circular motor into rectilinear motion, and a transport system using the linear motor, i.e., a linear motor-based motion stage, is being widely applied in various fields such as semiconductor devices.

Such a linear motor motion stage includes a mover including an electromagnet, a magnet track in which a N pole and a S pole are alternately arranged in a line and which straightly moves the mover by generating an electromagnetic force in a gap with the mover, a base including the mover and the magnet track, and an elastic body which is connected to the magnet track and returns the magnet track which is moved by a repulsive force (i.e., reaction force) generated by movement of the mover in a direction opposite to the mover's moving direction to its original position.

In the linear motor motion stage configured as described above, when the mover moves, the base is vibrated by the reaction force and the elastic body connected to the magnet track.

Conventionally, in order to attenuate such vibration, a spring has been provided between the magnet track and the base or an eddy current attenuator has been included. However, according to the conventional method, the spring or the eddy current attenuator needs to be replaced to change a spring force generated by movement of the magnet track or characteristics of vibration attenuation occurring in the eddy current attenuator.

Further, Korean Patent No. 10-1644175 (entitled "Linear motor stage") includes: a base; a magnet track moving on the base; a mover which is moved on a surface of the magnet track by an electromagnetic force generated in a gap with the magnet track; and a pair of first and second reaction force compensation units arranged on one side and the other side, respectively, of the magnet track and configured to attenuate a reaction force applied to the base by movement of the mover. Herein, the first reaction force compensation unit is movably provided on the base and includes a first eddy current attenuator arranged on one side of the magnet track and a first elastic member connecting the first eddy current attenuator to the base, and the second reaction force compensation unit is movably provided on the base and includes a second eddy current attenuator arranged on the other side of the magnet track and a second elastic member connecting the second eddy current attenuator to the base.

SUMMARY

In view of the foregoing, the present disclosure is provided to improve reaction force compensation of a linear motor motion stage, and provides a linear motor motion stage that controls a reaction force compensation function by using initial strain of a horizontal spring arranged in parallel with a moving direction of a magnet track and a spring arranged in non-parallel with the magnet track. However, problems to be solved by the present disclosure are not limited to the above-described problems. There may be other problems to be solved by the present disclosure.

According to a first aspect of the present disclosure, a linear motor motion stage includes: a base; a magnet track moving on the base; a mover which is moved on a surface of the magnet track by an electromagnetic force generated in a gap with the magnet track; first and second horizontal springs arranged between one side and the other side, respectively, of the magnet track and the base and configured to attenuate a reaction force applied to the base by movement of the mover; and a cross spring arranged between a lower side of the magnet track and the base and configured to attenuate the reaction force. Herein, reaction force compensation applied to the linear motor motion stage is controlled by controlling the stiffness of the cross spring.

According to a second aspect of the present disclosure, a method of compensating a passive reaction force in a linear motor motion stage, which includes: a base; a magnet track moving on the base; a mover which is moved on a surface of the magnet track by an electromagnetic force generated in a gap with the magnet track; first and second horizontal springs and a cross spring arranged between one side, the other side, a lower side, respectively, of the magnet track and the base and configured to attenuate a reaction force applied to the base by movement of the mover, includes: controlling the stiffness of the cross spring; and controlling reaction force compensation applied to the linear motor motion stage by controlling the stiffness of the cross spring.

According to the above-described aspects of the present disclosure, horizontal springs and a cross spring are combined with a magnet track, and the stiffness of all the springs is controlled by controlling the stiffness of the cross spring, and, thus, reaction force compensation to the linear motor motion stage can be easily controlled.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
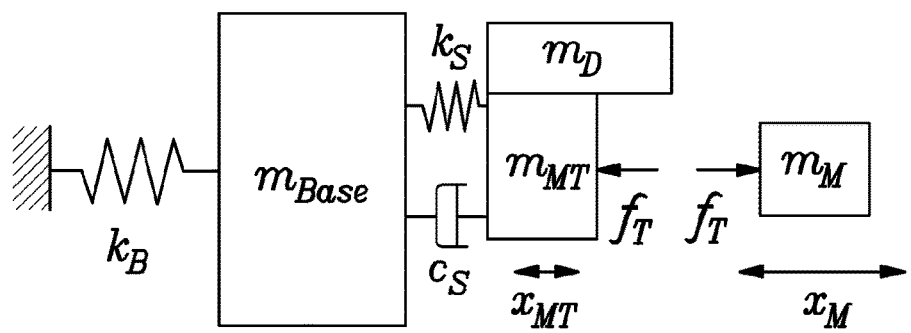
FIG. 1 is a diagram provided to explain a principle of reaction force compensation to a conventional linear motor motion stage.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the term "on" that is used to designate a position of one element with respect to another element includes both a case that the one element is adjacent to the other element and a case that any other element exists between these two elements.

Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise. Through the whole document, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

For reference, in the explanation of the exemplary embodiments, the terms (upper side, lower side, etc.) related to directions or positions are defined with reference to arrangement of respective components illustrated in the drawings. By way of example, referring to FIG. 2, a 12 o'clock direction may be generally an upper side and a 6 o'clock direction may be generally a lower side.

FIG. 1 is a diagram provided to explain a principle of reaction force compensation to a conventional linear motor motion stage.

The linear motor motion stage may include a base $m_{Base}$ and a magnet track $m_{MT}$ moving on the base, and a reaction force of the magnet track is compensated by supporting the magnet track with a spring ks and a damper Cs. Further, the magnet track may be further combined with an additional mass $m_D$, and, thus, an inertial force is increased and a displacement of the magnet track is decreased. Therefore, a spring force transmitted to the base is decreased and a transmission force can be decreased. Meanwhile, the linear motor motion stage configured as described above is disclosed in more detail in Korean Patent No. 10-1644175 (entitled "Linear motor stage") as a prior art patent disclosed by the inventors of the present disclosure, and, thus, detailed descriptions about the linear motor motion stage are not provided herein.

As the size of a display panel or a semiconductor processed in the conventional linear motor motion stage apparatus has increased, a moving mass and a working area of a mover have increased, and, thus, the linear motor motion stage apparatus has been required to have a higher reaction rate and a high accuracy.

A residual vibration of the linear motor motion stage apparatus caused by a high-speed movement has a bad effect on the quality of a target object to be processed, a processing time, and a lifetime of the apparatus. If the linear motor motion stage apparatus is moved with increasing speed or decreasing speed, a great reaction force is generated, and, thus, oscillation having an unacceptable degree of amplitude may be generated or time required to stabilize oscillation may be increased.

A base vibration of the linear motor motion stage apparatus can be reduced by using a passive reaction force compensation method. The passive reaction force compensation method does not use an additional external structure or actuator and thus has advantages of low cost and a simple structure. However, the passive reaction force compensation method does not allow real-time modification of dynamic characteristics and when a motion profile excites a natural frequency of RFC mode, resonance can be generated.

An active reaction force compensation method may use an additional coil to regulate the strength of the magnet track and can reduce a force transmitted under the conditions where a motion profile vibration is generated. However, the active reaction force compensation method can increase energy and may lead to an increase in cost due to the addition of a motion controller or a server amplifier.

In the present disclosure, a negative stiffness method is applied to the passive reaction force compensation method to provide a linear motor motion stage apparatus to which an improved reaction force compensation method is applied.

Figure 2A:
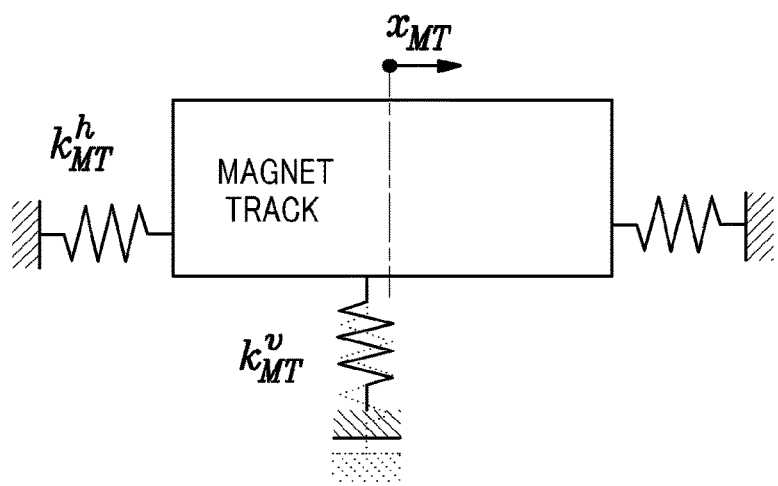
FIG. 2A illustrates an example of a magnet track in a linear motor motion stage according to an exemplary embodiment of the present disclosure.
Figure 2B:
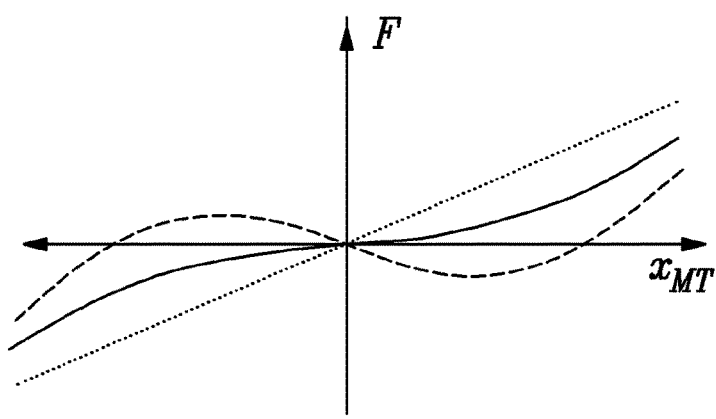
FIG. 2B is a diagram provided to explain stiffness supplied to the magnet track according to an exemplary embodiment of the present disclosure.
Figure 3:
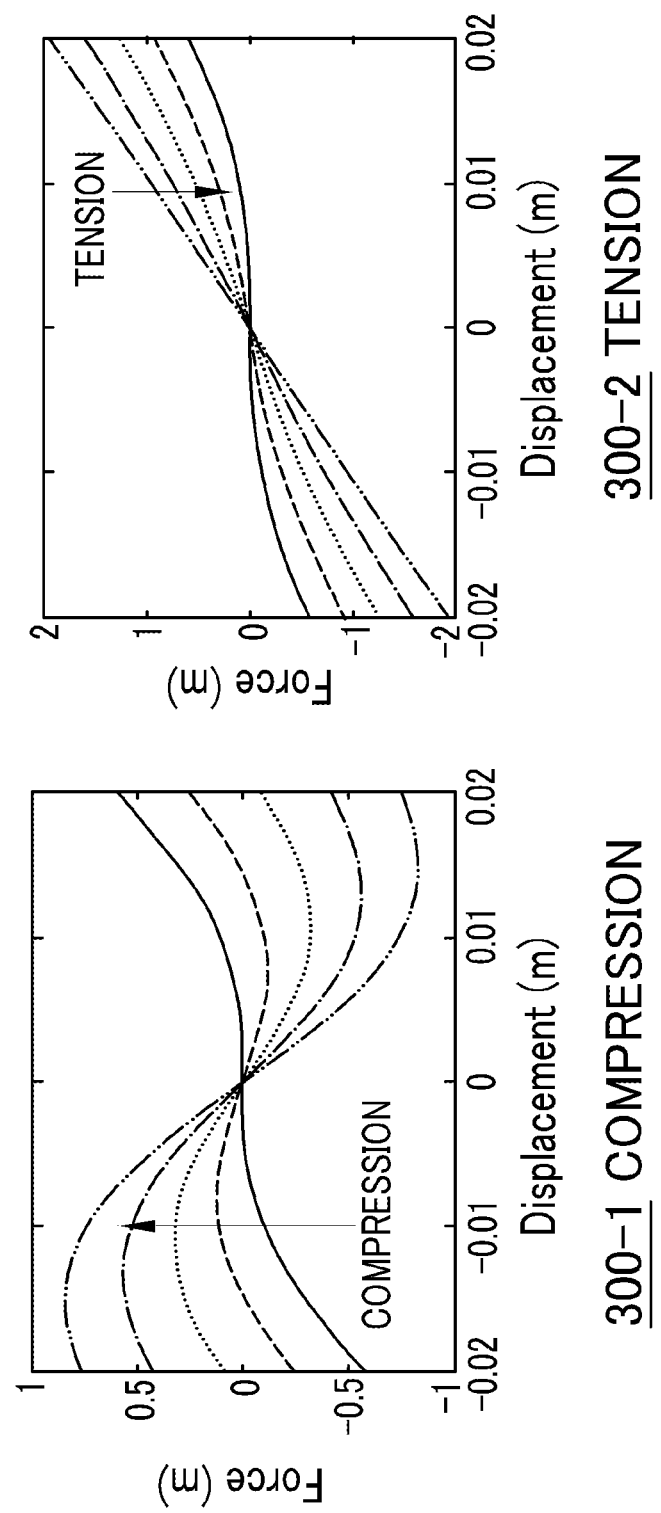
FIG. 3 is a diagram provided to explain a change in stiffness of all of springs depending on a compression or tension state of a cross spring.

FIG. 2 to FIG. 4 are diagrams provided to explain a linear motor motion stage apparatus having a passive reaction force compensation function according to an exemplary embodiment of the present disclosure.

Firstly, referring to FIG. 2A, a cross spring $K_{MT}^v$ as well as a horizontal spring $K_{MT}^h$ is combined with a magnet track of the linear motor motion stage apparatus.

A passive reaction force compensation device may generate resonance or great residual vibration may occur depending on input motion profiles of various shapes that define a motion of the linear motor motion stage apparatus. Therefore, it is necessary to control the stiffness of a spring. However, in order to control the stiffness of a spring included in a conventional passive reaction force compensation device, the spring needs to be replaced each time.

Accordingly, in the present disclosure, the cross spring is added to a lower end portion of the magnet track and the amount of pre-compression or pre-tension of the spring is controlled in order to enable a user to change the stiffness of all springs provided in the magnet track.

Referring to FIG. 2B, in the case where only a horizontal spring is present, a horizontal force is generated in proportion to a motion of the magnet track due to linear characteristics. However, in the case where a cross spring is further provided in a direction perpendicular to a moving direction of the magnet track as shown in the present disclosure, the stiffness of all the springs provided in the magnet track is changed nonlinearly since a vertical spring has nonlinear characteristics.

A planar stage apparatus according to the passive reaction force compensation method using the negative stiffness method includes a moving magnet track, a horizontal spring, and a previously compressed or tensed cross spring.

A force applied to the planar stage apparatus according to the passive reaction force compensation method using the negative stiffness method and a motion of the magnet track are as shown in FIG. 2A. The previously compressed cross spring generates a nonlinear horizontal force, whereas the horizontal spring generates a horizontal force in proportion to a motion of the magnet track. The stiffness of all the springs in the planar stage apparatus according to the passive reaction force compensation method using the negative stiffness method is equal to the sum of stiffness of the horizontal spring and the cross spring.

FIG. 3 shows a change in stiffness of all of springs depending on a compression or tension state of a cross spring. That is, as shown in 300-1 of FIG. 3, it can be seen that as the amount of pre-compression of the cross spring is increased, nonlinearity in stiffness of all the springs is further increased. Likewise, as shown in 300-2 of FIG. 3, it can be seen that as the amount of pre-tension of the horizontal spring is increased, nonlinearity in stiffness of all the springs is further increased. Therefore, the stiffness of all the springs can be controlled depending on the amount of pre-compression or pre-tension of the cross spring.

Figure 4A:
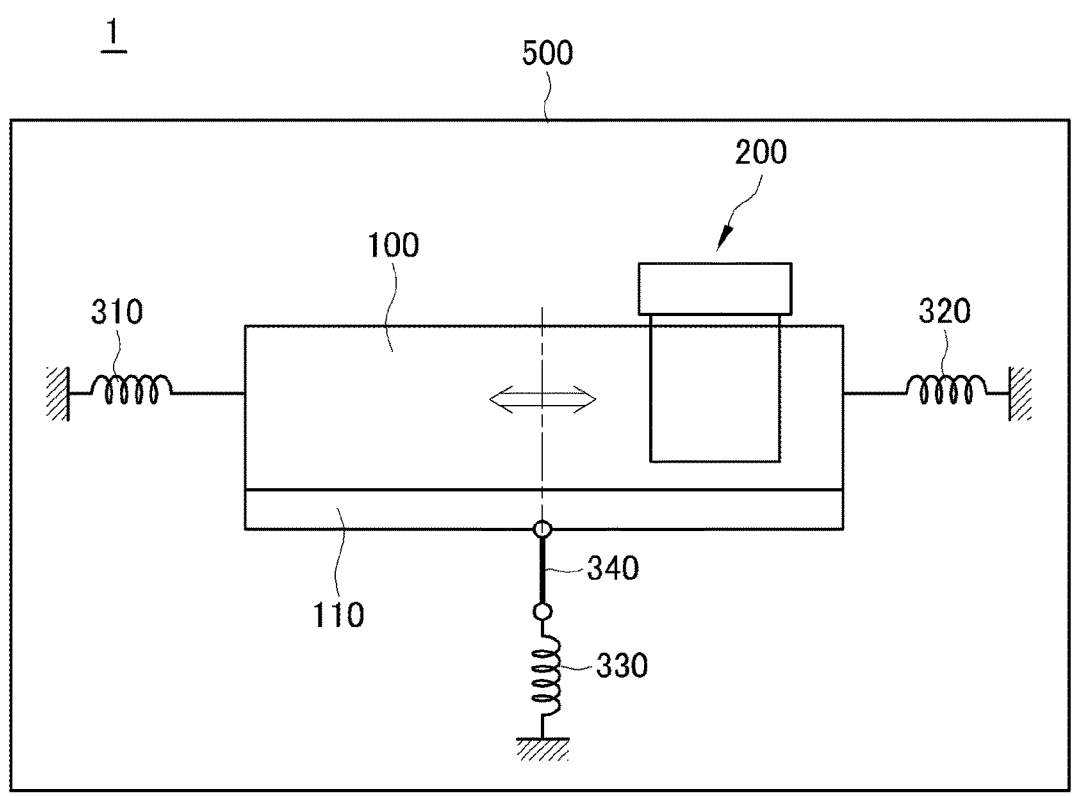
FIG. 4A and FIG. 4B are diagrams illustrating a linear motor motion stage apparatus having a passive reaction force compensation function according to an exemplary embodiment of the present disclosure.
Figure 4B:
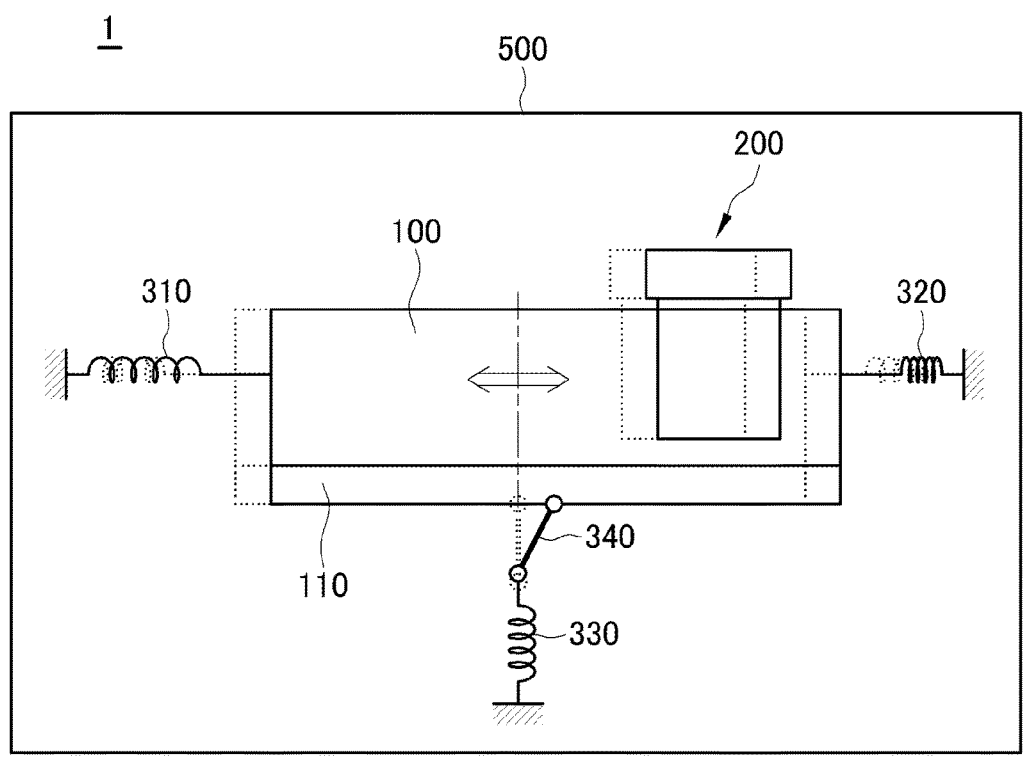

FIG. 4A and FIG. 4B are diagrams illustrating a linear motor motion stage apparatus having a passive reaction force compensation function according to an exemplary embodiment of the present disclosure.

The present linear motor stage 1 includes a base 500, a magnet track 100 moving on the base 500, a mover 200 which is moved on a surface of the magnet track 100 by an electromagnetic force generated in a gap with the magnet track 100.

Further, the present linear motor stage 1 includes multiple horizontal springs 310 and 320 arranged on one side and the other side, respectively, of the magnet track 100 and configured to attenuate a vibration of the base 500. Furthermore, the present linear motor stage 1 includes a cross spring 330 arranged on a lower side of the magnet track 100 and configured to attenuate the vibration of the base 500. Desirably, the cross spring 330 may be combined with the lower side of the magnet track 100 in a vertical direction. Moreover, the present linear motor stage 1 may include a link 340 that connects the cross spring 330 and the magnet track 100. Thus, in the case where the magnet track 100 is moved in a horizontal direction, the link 340 is moved in the horizontal direction accordingly. Therefore, the cross spring 330 can maintain a compression or tension state of the cross spring 330 in an initially set crossing direction regardless of movement of the magnet track 100.

That is, as illustrated in FIG. 4B, in the case where the magnet track 100 is moved in the horizontal direction, the link 340 is also moved, and, thus, the cross spring 300->330 can maintain a compression or tension state while being in a vertical state.

In this case, the magnet track 100 may have a structure in which multiple N poles and S poles are alternately arranged in a line. Further, a transport rail (not illustrated) may be provided under the magnet track 100. The magnet track 100 may be provided on the base 500 to be movable by the transport rail.

Further, the mover 200 may be configured as an electromagnet. For example, the mover 200 may include a core and a coil provided along a circumference of the core. Further, the mover 200 may be arranged on a lower surface or an upper surface of the magnet track 100. If a current is applied to the coil of the mover 200, an electromagnetic force (thrust) may be generated between the mover 200 and the magnet track 100. Further, the mover 200 may be moved toward the magnet track 100 by the electromagnetic force.

As described above, when the mover 200 is moved by the electromagnetic force, a reaction force may be typically generated between the mover 200 and the magnet track 100, and the magnet track 100 may be moved straightly in the opposite direction to the mover 200 by the reaction force. In this case, an elastic body provided in the magnet track 100 applies a restoring force to the magnet track 100, and, thus, the magnet track 100 and the base 500 are vibrated.

The present linear motor stage 1 includes the first and second horizontal springs 310 and 320 and the cross spring 330 and thus can attenuate a vibration of the base 500.

That is, the first and second horizontal springs 310 and 320 attenuate a reaction force generated by movement of the mover 200 and transfers the reaction force to the base 500.

Meanwhile, in some exemplary embodiments, an attenuator configured to attenuate a movement parallel with the magnet track may be further arranged between the magnet track 100 and the horizontal springs 310 and 320. For example, the eddy current attenuator disclosed in Korean Patent No. 10-1644175 may be used as an attenuator, but this is an example and other attenuators of various types may be used.

Meanwhile, in some exemplary embodiments, an additional mass 110 may be further combined under the magnet track 100. Thus, the cross spring 300 may be combined with the additional mass 110.

Hereinafter, a passive reaction force compensation function of the linear motor motion stage apparatus will be described.

Figure 5:
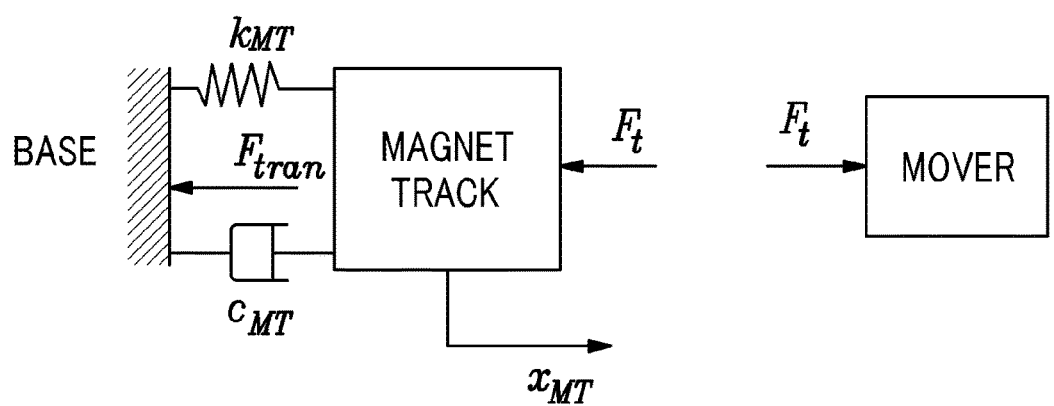
FIG. 5 is a diagram provided to explain an operation of a linear motion stage according to an exemplary embodiment of the present disclosure.

FIG. 5 is a diagram provided to explain an operation of a linear motion stage according to an exemplary embodiment of the present disclosure.

When the mover 200 is moved by a thrust Ft, a reaction force thereof vibrates the magnet track 100 and the magnet track 100 is supported by a spring $k_{MT}$ and a damper $c_{MT}$. Therefore, a motion of the magnet track 100 has a displacement $x_{MT}$.

The motion of the magnet track in the linear motor motion stage apparatus according to the passive reaction force compensation method can be defined by the following Equation 1. A horizontal movement of the magnet track 100 changes a compression or tension force of the cross spring, and, thus, a horizontal force of the magnet track is further generated. The horizontal force generated by the cross spring has nonlinear characteristics and is represented by a general nonlinear formula such as Equation 1. The total horizontal stiffness can be controlled by changing the stiffness of the cross spring, the initial amount of compression or tension, and the like.

$$m_{MT}\ddot{x}_{MT}+c_{MT}\dot{x}_{MT}+k_{MT}x_{MT}+(\Sigma_{i=0}^{\infty}\lambda_i x_{MT}^{2i+1})=F_t(t) \quad [\text{Equation 1}]$$

Further, a reaction force Ft may be divided into an inertial force of the magnet track 100 and a transmission force $F_{tran}$ transmitted to a base part of the system by the spring and the damper.

The transmission force $F_{tran}$ transmitted to the base part of the system can be defined by the following Equation 2. Therefore, the movement of the magnet track and the transmission force transmitted to the base part of the system can be changed by a change in characteristics of the cross spring.

$$F_{tran}=c_{MT}\dot{x}_{MT}+k_{MT}x_{MT}+(\Sigma_{i=0}^{\infty}\lambda_i x_{MT}^{2i+1}) \quad [\text{Equation 2}]$$

The magnet track displacement $X_{MT}$ and the transmission force $F_{tran}$ can be changed by controlling the mass of the additional mass and the stiffness of the spring. Although a reaction force is hardly transmitted to the base part of the system according to the passive reaction force compensation method, any one of harmonic elements included in a motion profile can activate a passive reaction force compensation system, and, thus, resonance may be generated.

As such, dynamic characteristics of the stiffness of all the springs can be variously controlled by controlling the stiffness of the cross spring, and, thus, reaction force compensation can be controlled in various manners.

A change in stiffness of the cross spring may be controlled passively by a user with a device (not illustrated) that passively controls the stiffness of the cross spring. Otherwise, an active control method for controlling the stiffness of the cross spring may be employed.

Figure 6:
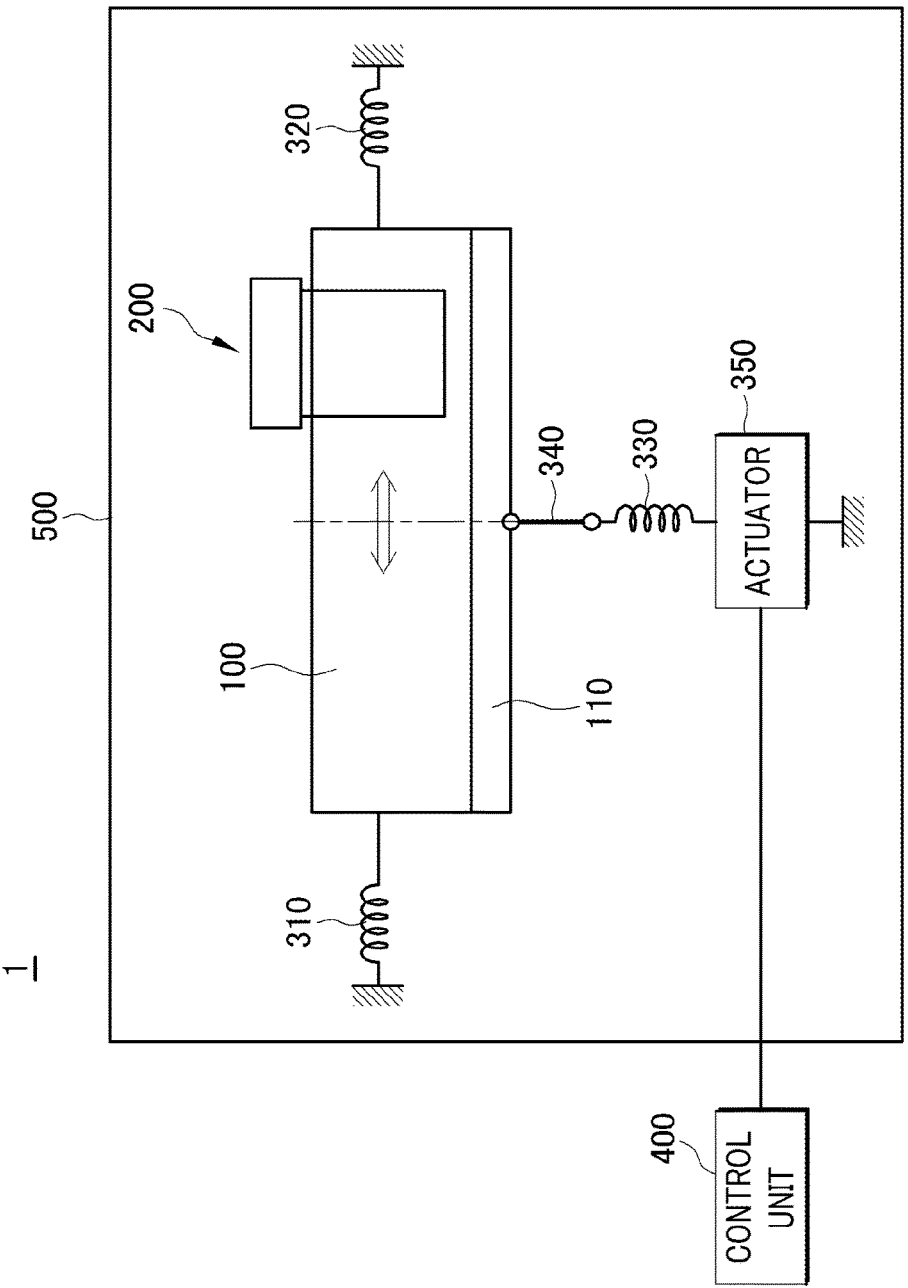
FIG. 6 is a diagram provided to explain an active control of a linear motor motion stage according to an exemplary embodiment of the present disclosure.

FIG. 6 is a diagram provided to explain an active control of a linear motor motion stage according to an exemplary embodiment of the present disclosure.

As shown in the drawing, an actuator 350 and a control unit 400 configured to control an operation of the actuator 350 may be further provided between the cross spring 330 and the base 500, and the stiffness of the cross spring can be controlled actively by the operation of the actuator 350.

The control unit 400 calculates the optimum amount of compression or tension of the cross spring on the basis of motion profile information input into the linear motor motion stage 1 and drives the actuator 350 on the basis of the calculated value to control the stiffness of the cross spring.

In this case, the motion profile refers to a set or sequence of commands that define a mechanical operation of the linear motor motion stage 1, and the control unit 400 calculates the optimum stiffness of the cross spring with reference to acceleration, accelerating time, maximum rate, amount of stroke, etc. defined in the motion profile.

Meanwhile, the control unit 400 calculates the stiffness of the cross spring in consideration of a displacement of the magnet track and a displacement of the mover in addition to the motion profile information. That is, the control unit 400 senses a current displacement state of the magnet track and a displacement state of the mover and applies the result to Equation 1 to calculate the optimum stiffness of the cross spring and then drives the actuator 350 on the basis of the calculated value to control the stiffness of the cross spring. The control unit 400 calculates the stiffness of the cross spring on the basis of a displacement of the magnet track and a displacement of the mover according to various feedback control methods such as PID control.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

I claim:

1. A linear motor motion stage having a passive reaction force compensation function, comprising:
   a base;
   a magnet track moving on the base;
   a mover which is moved on a surface of the magnet track by an electromagnetic force generated in a gap with the magnet track;
   multiple horizontal springs arranged between one side and the other side, respectively, of the magnet track and the base in a direction parallel with a moving direction of the magnet track and configured to attenuate a reaction force applied to the base by movement of the mover; and
   at least one cross spring arranged between a lower side of the magnet track and the base in a direction non-parallel with the moving direction of the magnet track and configured to attenuate the reaction force,
   wherein reaction force compensation applied to the linear motor motion stage is controlled depending on an initial strain of the cross spring.

2. The linear motor motion stage of claim 1,
   wherein the cross spring is arranged between the lower side of the magnet track and the base in a direction perpendicular to the moving direction of the magnet track.

3. The linear motor motion stage of claim 1, further comprising:
   one or more attenuators which are arranged between the magnet track and the horizontal springs and configured to attenuate movement of the magnet track.

4. The linear motor motion stage of claim 1,
   wherein nonlinearity in stiffness of all the springs is controlled by controlling the stiffness of the cross spring, and, thus, the reaction force compensation is controlled.

5. The linear motor motion stage of claim 1, further comprising:
   an additional mass arranged on the lower side of the magnet track,
   wherein the cross spring is arranged between the additional mass and the base.

6. The linear motor motion stage of claim 1, further comprising:
   a passive device configured to control an initial amount of compression or an initial amount of tension of the cross spring.

7. The linear motor motion stage of claim 1, further comprising:
   a control unit configured to calculate the amount of compression or the amount of tension of the cross spring on the basis of motion profile information input into the linear motor motion stage or a displacement of the magnet track or a displacement of the mover; and
   an actuator configured to control a state of the cross spring according to the amount of compression or the amount of tension of the cross spring calculated by the control unit.

8. A method of compensating a passive reaction force in a linear motor motion stage,
   wherein the linear motor motion stage comprises: a base; a magnet track moving on the base; a mover which is moved on a surface of the magnet track by an electromagnetic force generated in a gap with the magnet track; and multiple horizontal springs and a cross spring arranged between one side, the other side, a lower side, respectively, of the magnet track and the base and configured to attenuate a reaction force applied to the base by movement of the mover, and the method comprising:

controlling the stiffness of the cross spring; and controlling reaction force compensation applied to the linear motor motion stage by controlling the stiffness of the cross spring.

9. The method of compensating a passive reaction force of claim 8, wherein the step of controlling of the stiffness of the cross spring is performed by manipulating a device configured to control the amount of compression or the amount of tension of the cross spring.

10. The method of compensating a passive reaction force of claim 8, wherein the step of controlling of the stiffness of the cross spring includes:

calculating the amount of compression or the amount of tension of the cross spring on the basis of motion profile information input into the linear motor motion stage or a displacement of the magnet track or a displacement of the mover; and driving an actuator configured to control a state of the cross spring according to the calculated amount of compression or amount of tension of the cross spring.

* * * * *